US005805736A

United States Patent [19]
Kim

[11] Patent Number: 5,805,736
[45] Date of Patent: Sep. 8, 1998

[54] METHOD AND APPARATUS FOR ENCODING A CONTOUR OF AN OBJECT IN A VIDEO SIGNAL BY USING A CONTOUR MOTION ESTIMATION TECHNIQUE

[75] Inventor: Jin-Hun Kim, Seoul, Rep. of Korea

[73] Assignee: Daewoo Electronics, Co., Ltd., Seoul, Rep. of Korea

[21] Appl. No.: 687,314

[22] Filed: Jul. 25, 1996

[30] Foreign Application Priority Data

Jun. 12, 1996 [KR] Rep. of Korea ............... 96-20908

[51] Int. Cl.$^6$ ............... G06K 9/36; G06K 9/48
[52] U.S. Cl. ............... 382/242
[58] Field of Search ............... 382/236, 242, 382/743, 199; 348/402, 407, 413, 416, 431, 699; 358/261.2, 428, 430

[56] References Cited

U.S. PATENT DOCUMENTS 4,656,507  4/1987  Greaves et al. ............... 382/199
5,214,506  5/1993  Lin et al. ............... 348/415
5,598,215  1/1997  Watanabe ............... 382/242
5,608,458  3/1997  Chen et al. ............... 348/416

*Primary Examiner*—Joseph Mancuso
*Assistant Examiner*—Timothy M. Johnson

[57] ABSTRACT

A method encodes a contour of an object expressed in a digital video signal, the video signal having a plurality of video frames including a current and a previous frames, by using an improved contour motion estimation. Centroids of a current and a previous contours are first determined by averaging pixel positions on each contour, respectively, and a displacement therebetween is outputted as a motion vector. The previous contour is shifted based on the motion vector in order to produce the predicted current contour. Deviation information representing the difference between the predicted current and the current contours is detected based on the predicted current and the current contours and the centroid of the current contour and then is encoded.

27 Claims, 4 Drawing Sheets

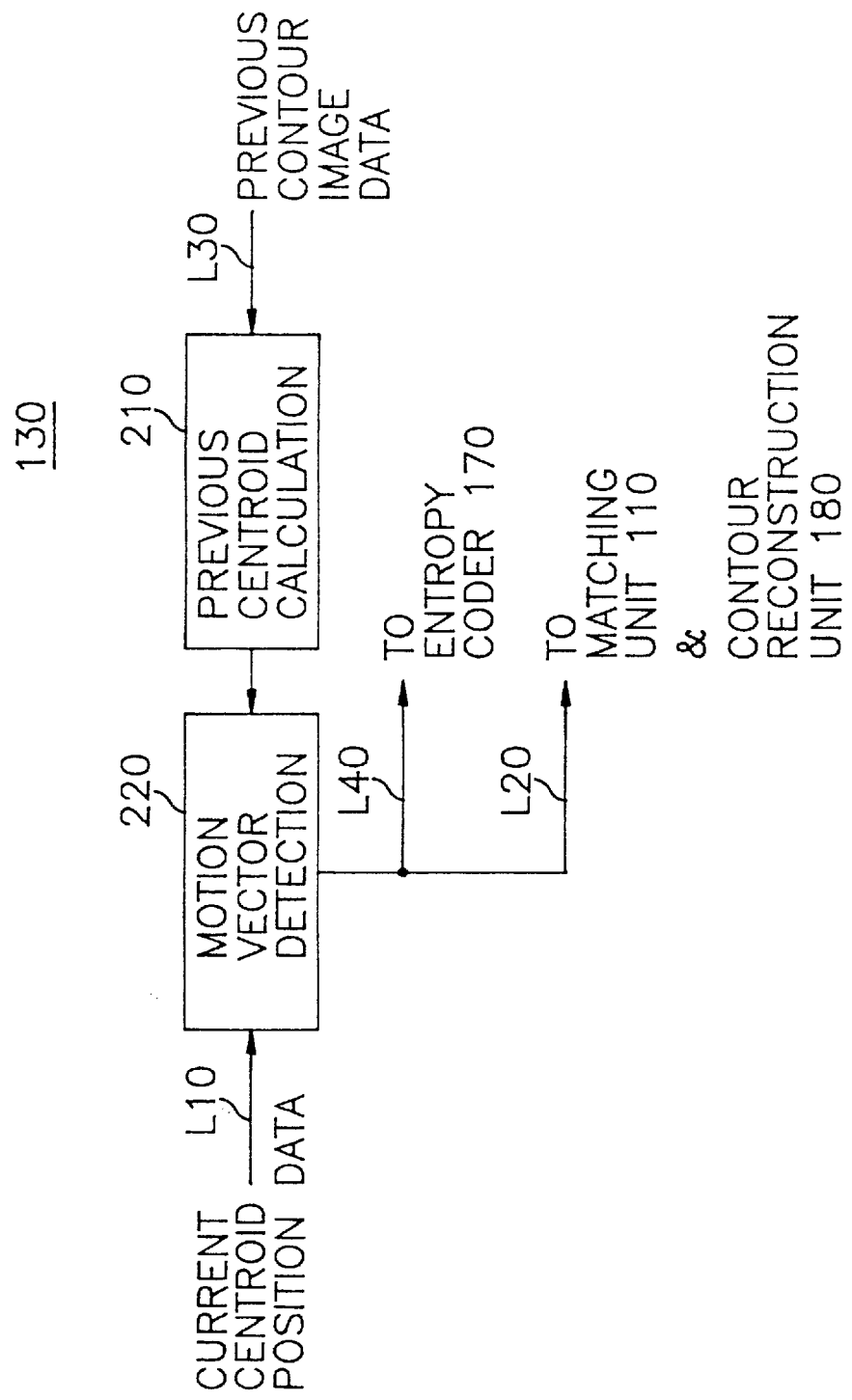

METHOD AND APPARATUS FOR ENCODING A CONTOUR OF AN OBJECT IN A VIDEO SIGNAL BY USING A CONTOUR MOTION ESTIMATION TECHNIQUE

FIELD OF THE INVENTION

This invention relates to a video signal encoding method and apparatus; and, more particularly, to a method and apparatus for encoding a contour of an object in a video signal.

DESCRIPTION OF THE PRIOR ART

In digital video systems such as video-telephone, teleconference and high definition television systems, a large amount of digital data is needed to define each video frame signal since the video frame signal comprises a sequence of digital data referred to as pixel values. Since, however, the available frequency bandwidth of a conventional transmission channel is limited, in order to transmit the substantial amount of the digital data therethrough, it is necessary to compress or reduce the volume of the data through the use of various data compression techniques, especially, in the case of such low bit-rate video signal encoders as video-telephone and teleconference systems.

One of such techniques for encoding video signals for a low bit-rate encoding system is an object-oriented analysis-synthesis coding technique, wherein an input video image is divided into objects and three sets of parameters for defining the motion, the contour and the pixel data of each object are processed through different encoding channels.

One example of such object-oriented coding scheme is the so-called MPEG(Moving Picture Experts Group) phase 4(MPEG-4), which is designed to provide an audio-visual coding standard for allowing content-based interactivity, improved coding efficiency and/or universal accessibility in such applications as low-bit rate communication, interactive multimedia(e.g., games, interactive TV, etc.) and surveillance (see, for instance, MPEG-4 Video Verification Model Version 2.0, International Organisation for Standardisation, ISO/IEC JTC1/SC29/WG11 N1260, March 1996).

According to MPEG-4, a frame of an input video image is divided into a plurality of video object planes(VOP's), which are accessible and manipulatable(cut, paste, etc.) entities in a bitstream by a user and can be referred to as an object. The width and height of each VOP may be the smallest multiples of 16 pixels(a macroblock size) surrounding each object so that the encoder processes the input video image on a VOP-by-VOP basis, i.e., an object-by-object basis. The VOP includes color information consisting of the luminance (Y) and the chrominance (U, V) components and shape information represented by, e.g., a binary mask.

In processing the shape of an object, contour information is important for the analysis and synthesis of the shape of the object. One of the classical coding schemes representing the contour information is a chain coding technique. However, in the chain coding technique, the amount of bits required is rather excessive.

In order to overcome the drawback, there have been proposed contour approximation techniques such as a polygonal approximation, a B-spline approximation, and a contour coding technique employing a polygonal approximation and discrete sine transform(DST) to encode the contour of an object effectively. Since, however, the contour of an object is encoded without regard to the temporal redundancies thereof, still a large amount of bits are required for encoding the contour in the contour approximation techniques.

In this connection, contour encoding methods including a contour motion estimation technique have been proposed to ameliorate the above problem. One of such coding schemes is disclosed in a commonly owned copending application, U.S. Pat. No. 5,635,986, issued on Jun. 3, 1997 and entitled "METHOD FOR ENCODING A CONTOUR OF AN OBJECT IN A VIDEO SIGNAL BY USING A CONTOUR MOTION ESTIMATION TECHNIQUE", wherein a difference of the contour of an object between two successive video frames is encoded by using a polygonal approximation and a DST. Even though it is possible to remove some of the temporal redundancies of the contour of an object, resulting in a reduction of the volume of data transmitted through the use of the aforementioned contour motion estimation technique, it still remains desirable to further reduce the volume of the transmission data in order to successfully accomplish the performance of a low-bit rate codec system having, e.g., a 64 kb/s transmission channel bandwidth.

SUMMARY OF THE INVENTION

It is, therefore, a primary object of the invention to provide an improved method and apparatus for encoding a contour of an object in a video signal, which is capable of further reducing the amount of transmission data.

Another object of the present invention is to provide an improved method and apparatus capable of reducing the computational burden or complexity in motion-estimating a contour of an object.

In accordance with the present invention, there is provided a method for encoding a contour of an object expressed in a digital video signal, the digital video signal having a plurality of video frames including a current frame and a previous frame, which comprises the steps of: (a) determining centroids of a current and a previous contours by averaging pixel positions on each of said contours; (b) detecting a displacement between the centroids; (c) producing a predicted current contour by shifting the previous contour by the amount of said displacement; (d) generating an overlapped contour based on the predicted current and the current contours; (e) detecting deviation information representing a shape difference between the predicted current and the current contours based on the overlapped contour and the centroid of the current contour; and (f) encoding the deviation information.

BRIEF DESCRIPTION OF THE DRAWINGS

The above and other objects and features of the present invention will become apparent from the following description of preferred embodiments given in conjunction with the accompanying drawings, in which:

FIG. 2 presents a detailed block diagram of a current contour prediction unit shown in FIG. 1.

DETAILED DESCRIPTION OF THE PREFERRED EMBODIMENTS

Figure 1:
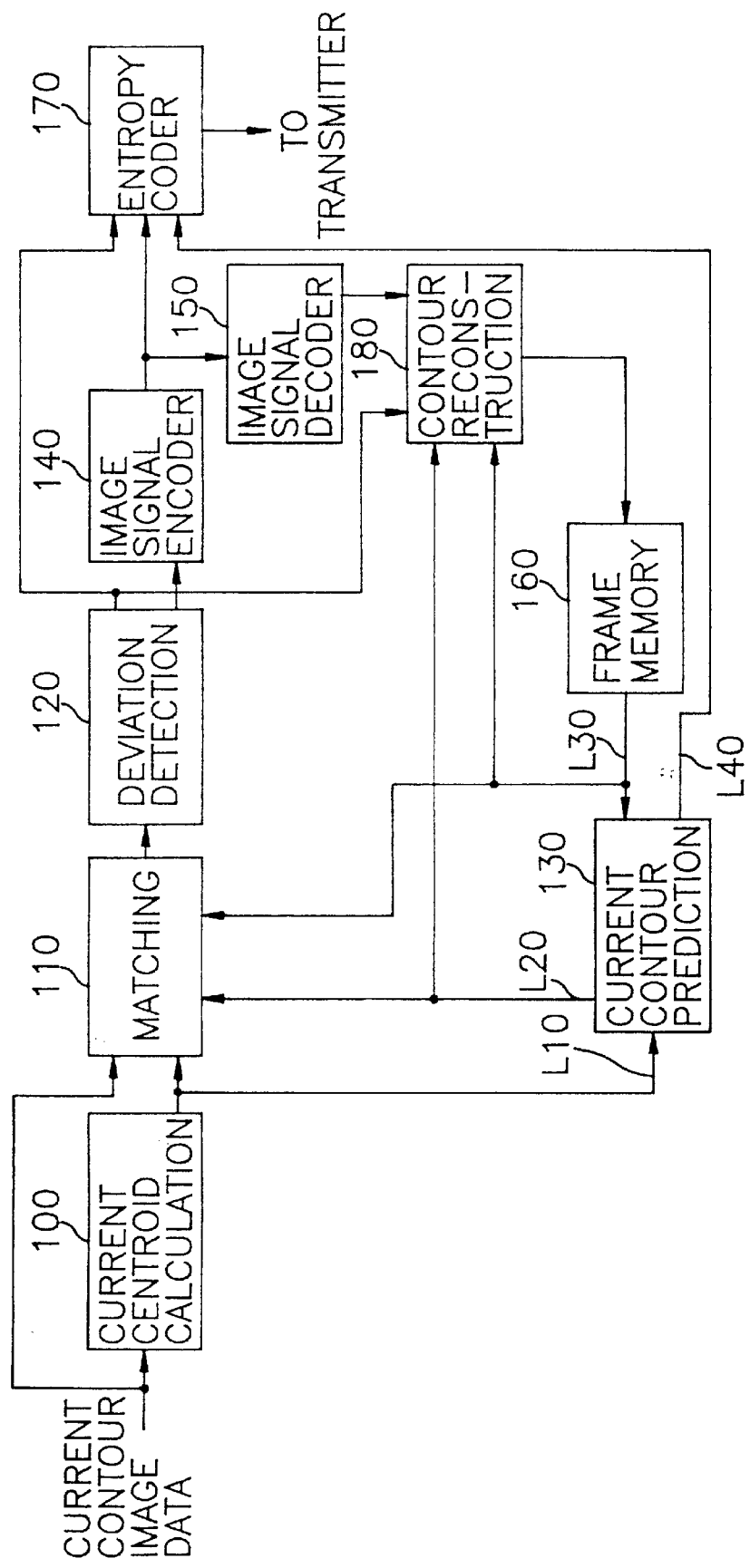
FIG. 1 provides a block diagram of a video signal encoder of the present invention.

Referring to FIG. 1, there is shown a block diagram of the inventive apparatus for encoding a contour of an object expressed in a video signal having a plurality of video frames including a current frame and a previous frame.

Current contour image data of an object, e.g., expressed in the form of a VOP(Video Object Plane) of the current frame, is fed to a current centroid calculation unit 100 and a matching unit 110, wherein the current contour image data includes position data of the contour pixels, the contour pixels representing pixels located on the contour of the object.

In accordance with the preferred embodiment of the present invention, the current centroid calculation unit 100 determines the centroid of the current contour by averaging coordinates of all the contour pixels of the current contour and produces current centroid position data. The current centroid position data is coupled to the matching unit 110 and a current contour prediction unit 130 through a line L10.

Referring to FIG. 2, there is shown a detailed block diagram of the current contour prediction unit 130 including a previous centroid calculation block 210 and a motion vector detection block 220. Same as in the current centroid calculation unit 100, the previous centroid calculation block 210 calculates previous centroid position data based on previous contour image data retrieved and inputted through a line L30 from a frame memory 160 as shown in FIG. 1 and outputs the previous centroid position data to the motion vector detection block 220, wherein the previous contour image data stored in the frame memory 160 includes position data of contour pixels of the object in the previous frame. The motion vector detection block 220 calculates the displacement between the centroids of the current and the previous contours based on the current centroid position data on the line L10 and the previous centroid position data supplied from the previous centroid calculation block 210. The calculated displacement is outputted as a motion vector to the matching unit 110 and a contour reconstruction unit 180 via a line L20 and an entropy coder 170 through a line L40.

Referring back to FIG. 1, the matching unit 110 shifts the previous contour image data provided from the frame memory 160 by the motion vector and generates overlapped contour image data to provide it to a deviation detection unit 120, wherein the overlapped contour image data includes centroid position data identical to the current centroid position data and position data of the identified contour pixels of the current contour and a predicted current contour, i.e., the shifted previous contour. The deviation detection unit 120 detects, in accordance with the present invention, the difference between the current contour and the predicted current contour based on the overlapped contour image data.

Figure 3A:
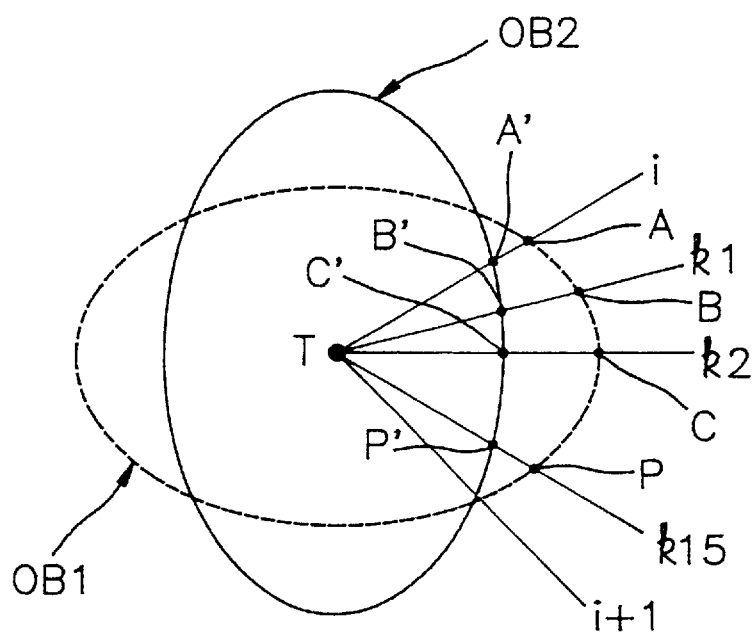
FIGS. 3A and 3B offer illustrative diagrams describing a deviation calculation process.
Figure 3B:
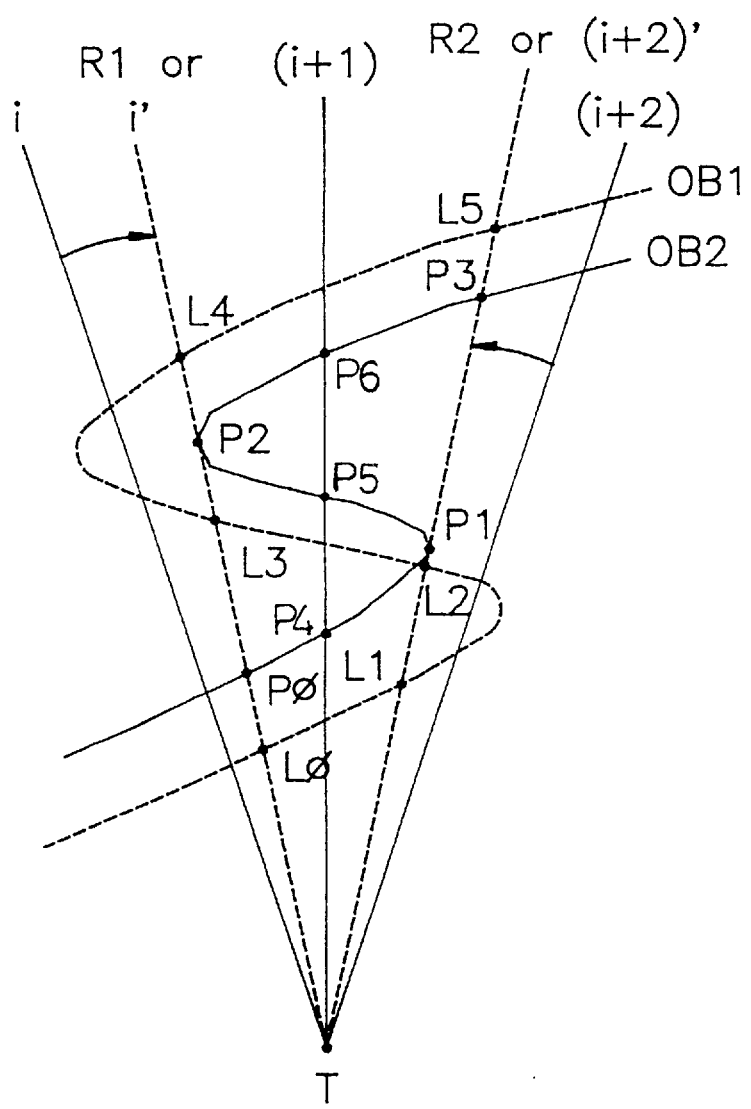

Referring to FIGS. 3A and 3B, there are shown illustrative diagrams describing a deviation detection process. The deviation detection process for the current and the predicted current contours of a simple, e.g., convex, closed loop is depicted in FIG. 3A, wherein the deviation detection unit 120 first draws from the centroid T a set of M number of radial equiangular primary segmentation lines starting from a predetermined reference segmentation line, the magnitude of the angle between two adjacent primary segmentation lines being $2\pi/M$ radian, M being an integer larger than 1, and then subdivides the angle between every two adjacent primary segmentation lines, e.g., ith and (i+1)th primary segmentation lines, by drawing N−1 number of radial equiangular secondary segmentation lines, e.g., k1 to k15, therebetween, N being a positive integer. Thereafter, the deviation detection unit 120 detects intersection points of the total M×N number of segmentation lines intersecting with the overlapped contour, e.g., as exemplarily shown in FIG. 3A, A to P on the predicted current contour OB1 and A' to P' on the current contour OB2. Once all the intersection points of M×N number of segmentation lines are detected, the deviation detection unit 120 calculates, for instance, starting from the reference segmentation line and moving clockwise, errors at all the intersection points of all the segmentation lines with the current contour, e.g., A', B', C', . . . , and P', wherein each error is calculated by subtracting the distance between the centroid T and an intersection point of each segmentation lines with the current contour, e.g., $\overline{TA'}$, from the distance between the centroid T and an intersection point of said each segmentation line with the predicted current contour, e.g., $\overline{TA}$. After calculating all the errors at all the intersection points on the current contour OB2 by using the deviation detection process as described above, the errors are grouped into a set of arrays, each array including N number of errors, as follows:

$$D_1 = [d_1^1, d_2^1, \ldots, d_j^1, \ldots, d_N^1]$$
$$D_2 = [d_1^2, d_2^2, \ldots, d_j^2, \ldots, d_N^2]$$
$$\vdots$$
$$D_I = [d_1^I, d_2^I, \ldots, d_j^I, \ldots, d_N^I]$$
$$\vdots$$
$$D_M = [d_1^M, d_2^M, \ldots, d_j^M, \ldots, d_N^M]$$

wherein $D_I$ represents an Ith array; $d^I_1$, an error for an Ith primary segmentation line; and $d^I_j$, an error for a jth secondary segmentation line between the Ith and (I+1)th primary segmentation line with I and j ranging from 1 to M and 2 to N, respectively, $d^M_j$ representing an error for a jth secondary segmentation line between the Mth and the first primary, i.e., reference, segmentation line.

In another preferred embodiment of the present invention, the number M of the primary segmentation lines is adjusted adaptively to the size of the overlapped contour. That is, based on distances between the centroid T and the intersection points on the predicted current contour OB1, the mean value thereof is calculated for a predetermined M first; and thereafter the number M is adjusted such that M increases as the mean value increases with respect to appropriate threshold values.

Referring to FIG. 3B, there is illustrated a deviation detection process in case the predicted current and the current contours are not of a simple convex shape, i.e., the number of intersection points between the overlapped contour and a segmentation line is greater than 2. The deviation detection unit 120 first draws M×N segmentation lines in the same manner as described above for FIG. 3A and detects the number of intersection points of each segmentation line with the current contour. If the number of intersection points of any segmentation line with the current contour is greater than 1, the process precedes with a next step for finding reference radial lines. For instance, as shown in FIG. 3B, if some of the segmentation lines between the ith and (i+2)th primary segmentation lines have more than one intersection point with the current contour, a set of radial lines are drawn therebetween from the centroid T; and the number of intersection points between the current contour OB2 and each radial line is detected, the angle between adjacent radial lines being of a predetermined small value. A reference radial line is defined as a radial line tangent to the current contour. For example, the reference radial lines R1 and R2 are tangent to the current contour OB2 at P1 and P2, wherein the points P1 and P2 are turning points where curvature tracking reverses its direction. Once the reference radial lines, e.g., R1 and R2, are determined, a primary segmentation line closest to a reference radial line is shifted to overlap with the reference radial line, thereby providing rearranged primary segmentation lines, for instance, the ith and (i+2)th primary segmentation lines are moved to R1 and R2 positions, respectively. When the primary segmentation line closest to the reference radial line is not available, the next closest available primary segmentation line can be used. The N-1 number of secondary segmentation lines between rearranged primary segmentation lines are also rearranged so that the magnitudes of all the angles subdivided by the secondary segmentation lines are equal; and intersection points between each rearranged segmentation lines and the overlapped contour are detected. Once all the intersection points on rearranged M×N number of segmentation lines are detected, the deviation detection unit 120 calculates all the errors at all the intersection points of each segmentation line with the current contour. Each error is calculated in the same manner described with respect to FIG. 3A in case a segmentation line meets with the current and the predicted current contours at one point, respectively.

However, if a segmentation line intersects with the current or predicted current contour at more than one point, an error at each intersection point of the current contour with the segmentation line is determined with respect to an intersection point closest to the centroid among intersection points of the predicted current contour with the segmentation line. For instance, the rearranged primary segmentation line i'th has two intersection points P0 and P2 with the current contour OB2 and three intersection points L0, L3 and L4 with the predicted current contour OB1. In such a case, errors at P0 and P2 are obtained with respect to L0 which is the one closest to the centroid T among the intersection points of the rearranged i'th segmentation line with the predicted current contour OB1, by subtracting the distances $\overline{TP0}$ and $\overline{TP2}$ from the distance $\overline{TL0}$, respectively. Likewise, errors at P1 and P3 are calculated with reference to L1 which is closer to the centroid than the rest of the intersection points, L2 and L5. After calculating the errors at all the intersection points of all the segmentation lines with the current contour OB2 by using the deviation detection process as described above, the errors are arranged in an appearing sequence of intersection points along the current contour in a predetermined, e.g., clockwise, direction starting from an intersection point of the reference primary segmentation line with the current contour. The arranged errors are grouped into a set of arrays in a manner similar to the one used in FIG. 3A. It should be noted, however, there are produced triplet arrays, e.g., corresponding to the lines $\overline{P0P4}$, $\overline{P5P2}$, $\overline{P2P6}$, etc., for each pair of primary segmentation lines i', (i+1) and (i+1), (i+2)'. From the deviation detection unit 120, deviation information representing the set of arrays determined by the above process is dispatched to an image signal encoder 140 and turning point information is transferred to the entropy coder 170 and the contour reconstruction unit 180, wherein the turning point information includes position information of the turning points, e.g., P1 and P2, and sequence information representing their sequence appearing along the contour.

The image signal encoder 140 transforms each array included in the deviation information from the deviation calculation unit 120 into a set of quantized transform coefficients, e.g., by using a one-dimensional DCT(discrete cosine transform) and any of the known quantization methods. The sets of the quantized transform coefficients are then transmitted therefrom to the entropy coder 170 and an image signal decoder 150.

At the entropy coder 170, the sets of the quantized transform coefficients from the image signal encoder 140, the motion vector on the line L40 from the current contour prediction unit 130 and the turning point information from the deviation detection unit 120 are coded together by using, e.g., a known variable length coding technique; and transmitted to a transmitter(not shown) for the transmission thereof.

Meantime, the image signal decoder 150 converts the sets of the quantized transform coefficients from the image signal encoder 140 back into reconstructed deviation information by employing an inverse quantization and an inverse DCT and provides the reconstructed deviation information to the contour reconstruction unit 180.

The contour reconstruction unit 180 generates the predicted current contour by shifting the previous contour from the frame memory 160 by the motion vector; and produces a reconstructed current contour to be stored as an updated previous contour in the frame memory 160 based on the predicted current contour, the reconstructed deviation information from the image signal decoder 150 and the turning point information, if exists, from the deviation detection unit 120.

While the present invention has been described with respect to certain preferred embodiments only, other modifications and variations may be made without departing from the spirit and scope of the present invention as set forth in the following claims.

What is claimed is:

1. A method for encoding a contour of an object expressed in a digital video signal, said digital video signal having a plurality of video frames including a current frame and a previous frame, which comprises the steps of:

(a) determining centroids of a current and a previous contours by averaging pixel positions on each of the contours, wherein the current and the previous contours represent the contours of the object in the current and the previous frames, respectively;

(b) detecting a displacement between the centroids;

(c) generating an overlapped contour based on the previous and the current contours and the displacement;

(d) detecting deviation information representing the shape difference between the previous and the current contours based on the overlapped contour and the centroid of the current contour; and (e) encoding the deviation information, wherein said step (c) includes the steps of:

(c1) producing a predicted current contour by shifting the previous contour by the displacement; and (c2) overlapping the predicted current contour and the current contour with reference to the centroid of the current contour to thereby generate the overlapped contour, and, said step (d) includes the steps of:

(d11) drawing a plural number of radial segmentation lines from the centroid of the current contour;

(d12) detecting a current contour intersection point and a predicted current contour intersection point for each segmentation line, said each segmentation line intersecting the current and the predicted current contours at the current contour and the predicted current contour intersection points, respectively; and (d13) calculating an error at the current contour intersection point based on a difference between the intersection points of each segmentation line, thereby generating the deviation information.

2. The method as recited in claim 1, wherein the error is based on the distance between the centroid of the current contour and the predicted current contour intersection point on each segmentation line, wherein the predicted current contour intersection point is determined based on a distance between the intersection points for each segmentation line.

3. The method as recited in claim 2, wherein the error is determined by subtracting a distance between the centroid of the current contour and the current contour intersection point from a distance between the centroid of the current contour and the predicted current contour intersection point.

4. The method as recited in claim 3, wherein said step (d) further includes, before step (d11), the steps of:
(d21) detecting a size of the overlapped contour; and
(d22) determining the number of the radial segmentation lines based on the size of the overlapped contour.

5. The method as recited in claim 3, wherein said step (d) further includes, after step (d13), the step of grouping the deviation information into a multiplicity of arrays, each array having a predetermined number of errors.

6. The method as recited in claim 5, wherein the grouped deviation information is encoded on an array-by-array basis.

7. A method for encoding a contour of an object expressed in a digital video signal, said digital video signal having a plurality of video frames including a current frame and a previous frame, which comprises the steps of:
(a) determining centroids of a current and a previous contours by averaging pixel positions on each of the contours, wherein the current and the previous contours represent the contours of the object in the current and the previous frames, respectively;
(b) detecting a displacement between the centroids;
(c) generating an overlapped contour based on the previous and the current contours and the displacement;
(d) detecting deviation information representing the shape difference between the previous and the current contours based on the overlapped contour and the centroid of the current contour; and
(e) encoding the deviation information,
wherein said step (c) includes the steps of:
(c1) producing a predicted current contour by shifting the previous contour by the displacement; and
(c2) overlapping the predicted current contour and the current contour with reference to the centroid of the current contour to thereby generate the overlapped contour;
and, said step (d) includes the steps of:
(d31) drawing M number of primary radial segmentation lines from the centroid of the current contour starting from a preset reference radial segmentation line, M being an integer larger than 1;
(d32) detecting one or more turning points on the current contour, a turning point representing a point on the current contour at which a line connecting the centroid of the current contour and the turning point being tangential to the current contour;
(d33) drawing N−1 number of secondary radial segmentation lines between every two adjacent primary radial segmentation lines, N being a positive integer;
(d34) noticing one or more intersection points of each of the primary and the secondary radial segmentation lines with the current contour;
(d35) finding one intersection point of each of the primary and the secondary radial segmentation lines with the predicted current contour; and
(d36) calculating, moving in a predetermined direction along the current contour, an error at each current contour intersection point based on the difference between the intersection point on the current contour and the intersection point on the predicted current contour for said each segmentation line, thereby generating the deviation information.

8. The method as recited in claim 7, wherein the intersection point of each of the primary and the secondary radial segmentation lines with the predicted current contour is an intersection point closest to the centroid of the current contour among intersection points of said each segmentation line with the predicted current contour.

9. The method as recited in claim 8, wherein said step (d) further includes, before step (d31), the steps of:
(d41) detecting a size of the overlapped contour; and
(d42) determining the number M based on the size of the overlapped contour.

10. The method as recited in claim 8, wherein said step (d) further includes, if a turning point is detected, after the step (d32), the step of finding a primary radial segmentation line closest to the turning point and shifting the primary radial segmentation line to the turning point and when the closest primary radial segmentation line is not available, a next closest available primary radial segmentation line is used.

11. The method as recited in claim 10, wherein said step (d) further includes, after step (d36), the step of grouping the deviation information into a multiplicity of arrays, each array having a predetermined number of errors.

12. The method as recited in claim 11, wherein the predetermined number corresponds to the number N.

13. The method as recited in claim 12, wherein the grouped deviation information is encoded on an array-by-array basis.

14. An apparatus for encoding a contour of an object expressed in a digital video signal, said digital video signal having a plurality of video frames including a current frame and a previous frame, which comprises:
means for determining centroids of a current and a previous contours by averaging pixel positions on each of the contours, wherein the current and the previous contours represent the contours of the object in the current and the previous frames, respectively;
means for detecting a displacement between the centroids;
means for generating an overlapped contour based on the previous and the current contours and the displacement;
means for detecting deviation information representing the shape difference between the previous and the current contours based on the overlapped contour and the centroid of the current contour; and
means for encoding the deviation information,
wherein said overlapped contour generating means includes:
means for producing a predicted current contour by shifting the previous contour by the displacement; and
means for overlapping the predicted current contour and the current contour with reference to the centroid of the current contour to thereby generate the overlapped contour,
and, said deviation information detecting means includes:
means for drawing a plural number of radial segmentation lines from the centroid of the current contour;
means for detecting a current contour intersection point and a predicted current contour intersection point for each segmentation line, said each segmentation line intersecting the current and the predicted current contours at the current contour and the predicted current contour intersection points, respectively; and means for calculating an error at the current contour intersection point based on a difference between the intersection points of each segmentation line, thereby generating the deviation information.

15. The apparatus as recited in claim 14, wherein the error is based on the distance between the centroid of the current contour and the predicted current contour intersection point on each segmentation line, wherein the predicted current contour intersection point is determined based on a distance between the intersection points for each segmentation line.

16. The apparatus as recited in claim 15, wherein the error is determined by subtracting a distance between the centroid of the current contour and the current contour intersection point from a distance between the centroid of the current contour and the predicted current contour intersection point.

17. The apparatus as recited in claim 16, wherein said deviation information detecting means further includes:

means for detecting a size of the overlapped contour; and means for determining the number of the radial segmentation lines based on the size of the overlapped contour.

18. The apparatus as recited in claim 16, wherein said deviation information detecting means further includes means for grouping the deviation information into a multiplicity of arrays, each array having a predetermined number of errors.

19. The apparatus as recited in claim 18, wherein the grouped deviation information is encoded on an array-by-array basis.

20. An apparatus for encoding a contour of an object expressed in a digital video signal, said digital video signal having a plurality of video frames including a current frame and a previous frame, which comprises:

means for determining centroids of a current and a previous contours by averaging pixel positions on each of the contours, wherein the current and the previous contours represent the contours of the object in the current and the previous frames, respectively;

means for detecting a displacement between the centroids;

means for generating an overlapped contour based on the previous and the current contours and the displacement;

means for detecting deviation information representing the shape difference between the previous and the current contours based on the overlapped contour and the centroid of the current contour; and means for encoding the deviation information, wherein said overlapped contour generating means includes:

means for producing a predicted current contour by shifting the previous contour by the displacement; and means for overlapping the predicted current contour and the current contour with reference to the centroid of the current contour to thereby generate the overlapped contour, and, said deviation information detecting means includes:

means for drawing M number of primary radial segmentation lines from the centroid of the current contour starting from a preset reference radial segmentation line, M being an integer larger than 1;

means for detecting one or more turning points on the current contour, a turning point representing a point on the current contour at which a line connecting the centroid of the current contour and the turning point being tangential to the current contour;

means for drawing N−1 number of secondary radial segmentation lines between every two adjacent primary radial segmentation lines, N being a positive integer;

means for noticing one or more intersection points of each of the primary and the secondary radial segmentation lines with the current contour;

means for finding one intersection point of each of the primary and the secondary radial segmentation lines with the predicted current contour; and means for calculating, moving in a predetermined direction along the current contour, an error at each current contour intersection point based on the difference between the intersection point on the current contour and the intersection point on the predicted current contour for said each segmentation line, thereby generating the deviation information.

21. The apparatus as recited in claim 20, wherein the intersection point of each of the primary and the secondary radial segmentation lines with the predicted current contour is an intersection point closest to the centroid of the current contour among intersection points of said each segmentation line with the predicted current contour.

22. The apparatus as recited in claim 21, wherein said deviation information detecting means further includes:

means for detecting a size of the overlapped contour; and means for determining the number M based on the size of the overlapped contour.

23. The apparatus as recited in claim 21, wherein said deviation information detecting means further includes, if a turning point is detected, means for finding a primary radial segmentation line closest to the turning point and shifting the primary radial segmentation line to the turning point and when the closest primary radial segmentation line is not available, a next closest available primary radial segmentation line is used.

24. The apparatus as recited in claim 23, wherein said deviation information detecting means further includes means for grouping the deviation information into a multiplicity of arrays, each array having a predetermined number of errors.

25. The apparatus as recited in claim 24, wherein the predetermined number corresponds to the number N.

26. The apparatus as recited in claim 25, wherein the grouped deviation information is encoded on an array-by-array basis.

27. A method for encoding a contour of an object expressed in a digital video signal, said digital video signal having a plurality of video frames including a current frame and a previous frame, which comprises the steps of:

(a) determining centroids of a current and a previous contour by averaging pixel positions on each of the contours, wherein the current and the previous contours represent the contours of the object in the current and the previous frames, respectively;

(b) detecting a displacement between the centroids;

(c) generating an overlapped contour by shifting one of the current contour and the previous contour by the displacement;

(d) detecting deviation information representing the shape difference between the previous and the current contours based on the overlapped contour and the centroid of the previous contour; and (e) encoding the deviation information, wherein said step (d) includes the steps of:

(d51) drawing a plurality of radial segmentation lines from the centroid of the previous contour;

(d52) detecting a current contour intersection point and a previous contour intersection point for each segmentation line, said each segmentation line intersecting the shifted current and the previous contours at the current contour and the previous contour intersection points, respectively; and (d53) calculating an error at the current contour intersection point based on a difference between the intersection points of the segmentation lines, thereby generating the deviation information.

* * * * *

UNITED STATES PATENT AND TRADEMARK OFFICE
CERTIFICATE OF CORRECTION

PATENT NO.   :  5,805,736
DATED        :  September 8, 1998
INVENTOR(S)  :  Kim

It is certified that error appears in the above-identified patent and that said Letters Patent is hereby corrected as shown below:

On the title page: Item [56] insert the following,

FOREIGN PATENT DOCUMENTS

|   |   | DOCUMENT NUMBER |   |   |   |   |   | PUBLICATION DATE | COUNTRY OR PATENT OFFICE | CLASS | SUBCLASS | TRANSLATION YES | NO |
|---|---|---|---|---|---|---|---|---|---|---|---|---|---|
|   |   | 0 | 7 | 2 | 0 | 3 | 5 | 6 | 07/03/96 | EPO |   |   |   |   |

OTHER DOCUMENTS

| | | |
|---|---|---|
| | "Munich Meeting of MPEG-4 Working Group. Report ISO/IEC JTC1/SC29/WG11 | |
| | MPEG4/N1172" Coding of Moving Pictures And Associated Audio, January 1996, pp. 1-49 | |
| | Musmann H G et al., "Object-Oriented Analysis-Synthesis Coding of Moving Images" | |
| | Signal Processing. Image Communication, 1 January 1989, Vol. 1, pp. 117-138. | |
| | Hotter M, "Object-Oriented Analysis-Synthesis Coding Based on Moving Two-Dimensional | |
| | Objects" Signal Processing. Image Communication, 1 December 1990, | |
| | Vol. 2, no. 4, pp. 409-428 | |

Signed and Sealed this

Fourth Day of May, 1999

Attest:

Q. TODD DICKINSON

*Attesting Officer*       Acting Commissioner of Patents and Trademarks